United States Patent [19]

Eberle

[11] 4,033,402

[45] July 5, 1977

[54] AUTOMATED POST BURN STATION

[75] Inventor: William J. Eberle, Reading, Pa.

[73] Assignee: General Battery Corporation, Reading, Pa.

[22] Filed: Mar. 24, 1976

[21] Appl. No.: 669,749

Related U.S. Application Data

[60] Continuation-in-part of Ser. No. 618,772, Oct. 2, 1975, Pat. No. 3,980,126, which is a continuation-in-part of Ser. No. 432,545, Jan. 11, 1974, Pat. No. 3,954,216, which is a continuation-in-part of Ser. No. 395,528, Sept. 10, 1973, Pat. No. 3,861,575, which is a division of Ser. No. 184,338, Sept. 28, 1971, abandoned.

[52] U.S. Cl. .............................. 164/150; 164/154; 164/332; 164/334; 164/348; 164/DIG. 1; 228/58; 228/901
[51] Int. Cl.$^2$ ...................................... B22D 19/04
[58] Field of Search ............. 164/80, 96, 220, 221, 164/332, 334, DIG. 1, 4, 154; 228/25, 28, 51, 58, 901, 9, 102

[56] References Cited

UNITED STATES PATENTS

| 3,493,035 | 2/1970 | Tiegel et al. ............ 228/58 X |
| 3,842,893 | 10/1974 | Booth ........................ 164/4 |

Primary Examiner—Ronald J. Shore
Attorney, Agent, or Firm—Benasutti Associates, Ltd.

[57] ABSTRACT

An automated apparatus for sequentially forming integrally fused battery terminals on a plurality of storage batteries is described wherein a head means having a mold means adjustably mounted thereon is automatically movable with respect to a vertical axis, and has slidably mounted thereon a burning means for automatically producing a variable intensity flame for melting said battery elements to form said integrally fused battery terminal during a vertical stroke thereof. A novel molding means is described comprising a structural member composed of aluminum or other high heat transfer material, which is adapted to interchangeably engage an aluminum mold member which mates with a structural housing and which actually forms the voids in which the melting and casting processes take place. The mold members, which are also composed of aluminum or other high heat transfer material, are provided with a novel mold coating consisting essentially of aluminum oxide formed through a hard surface anodizing process. This novel mold coating is disposed on the surfaces of the mold members which define molding voids, and act as a thermal barrier to cause momentary delay of heat transfer from the melted terminal posts to the remainder of the mold members and their associated structural housings. This novel mold coating is described as having superior release characteristics, while facilitating the formation of high quality battery terminal posts. Novel means are provided wherein the mold member and structural member are complementally conformed to ensure inter-engagement in the operating position facilitating excellent heat transfer to the cooling medium. A novel thermocouple means is mounted on a structural member, the tip of which is embedded within a protrusion formed on the mold member, which thermocouple means and its associated logic cooperate with the operational logic to ensure that uniform high quality terminals are consistently produced.

5 Claims, 7 Drawing Figures

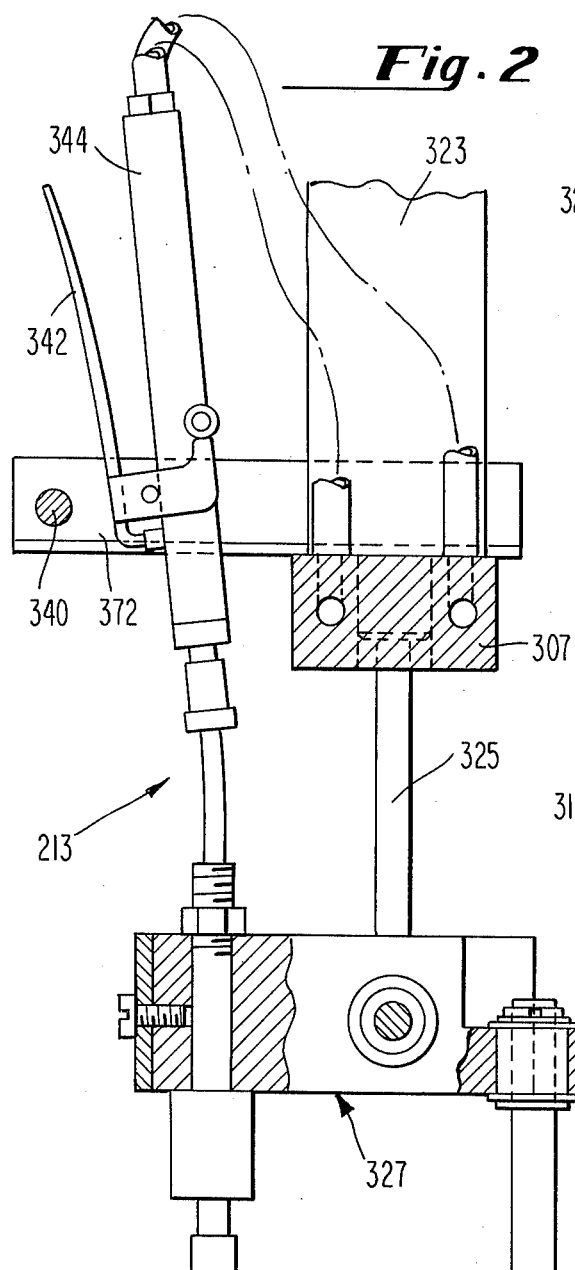
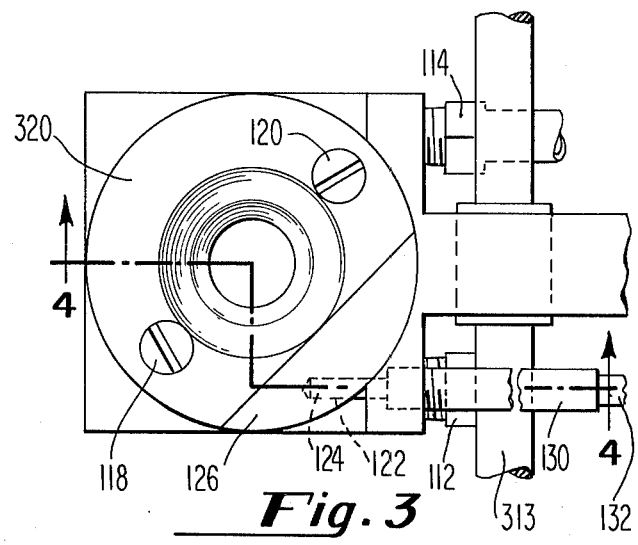
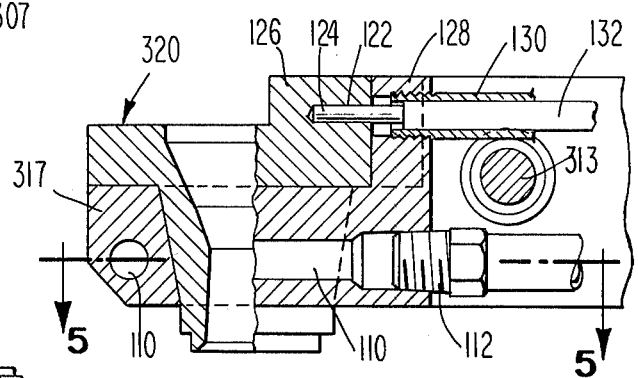
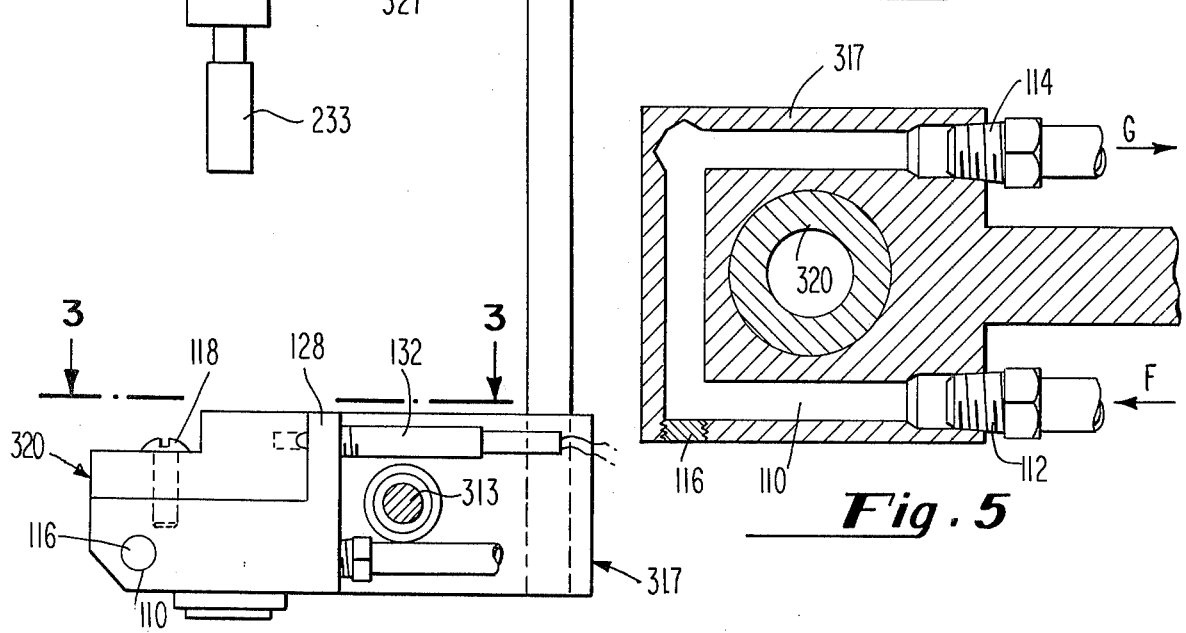

AUTOMATED POST BURN STATION

CROSS REFERENCE TO RELATED APPLICATIONS

This is a continuation-in-part of my prior copending patent application Ser. No. 628,772, filed Oct. 2, 1975, now U.S. Pat. No. 3,980,126, entitled "Automated Post Burn Station", which is in turn a continuation-in-part of Ser. No. 432,545, filed Jan. 11, 1974, now U.S. Pat. No. 3,954,216, entitled "Apparatus for Thermal Relay Welding" which in turn is a continuation-in-part application of U.S. patent application Ser. No. 395,528, filed Sept. 10, 1973, now U.S. Pat. No. 3,861,575, dated Jan. 21, 1975, which in turn was a divisional application of U.S. Ser. No. 184,338, filed Sept. 28, 1971, now abandoned, which applications are specifically incorporated by reference as if fully set forth herein.

The present application is also related to my prior copending application Ser. No. 659,572, filed Feb. 19, 1976, entitled "Method of Casting Lead Alloy Automotive Battery Parts"; Ser. No. 423,317, filed Dec. 10, 1973, now U.S. Pat. No. 3,934,624, dated Jan. 27, 1976, entitled "Acid Falling Apparatus for Batteries or the Like"; as well as to my prior copending patent application Ser. No. 605,271, filed Aug. 18, 1975, now U.S. Pat. No. 4,010,840, entitled "Automatic Air Leak Testing Apparatus and Method for Multiple Chambered Containers Such As Batteries", which applications are also specifically incorporated by reference as if fully set forth herein.

BACKGROUND OF THE INVENTION

The present invention relates generally to the field of battery post forming and/or burning, and more particularly, to the field of burning battery posts with battery cover bushings for the purpose of forming an integrally fused battery terminal on the outer surface of the battery case. This invention, therefore, relates to welding in general, and specifically, for welding battery terminal posts, as for example, the type of battery terminals used in automobile batteries.

In the welding of various members together, it is commonplace to use a welding rod having flux therein, for many types of welding, such as arc welding. In other instances, particularly when the material being welded together are soft, such as those comprising pot metal, lead, lead alloys, or like materials, welding may be effected by application of open flame to members that are to be welded together. In many instances, such techniques are highly desired and quite meritorious, however, in some instances, as, for example, when electrical conductivity is desired, it becomes paramount that the connection between members welded be such as to create minimal electrical resistance.

In the manufacture of electric storage batteries, such as the lead acid batteries normally used in automobiles, groups of battery plates and separators contained in separate cells in a battery case are placed in the case, after which time the various cells are joined in any of a number of ways to form intercellular connections therebetween. At the end of the storage battery, slender battery posts which will form the positive and negative terminals of the battery extend above the upper surface of the open battery case. These battery cases, which are normally composed of polypropylene or other plastic material, are adapted to receive thereon a polypropylene battery cover, which has formed therein two lead bushings adapted to be pierced by the battery posts when the cover is fitted onto the top of the case. A liquid-tight seal is then formed between the battery case and battery cover, either by gluing, ultrasonic welding, or by heat sealing means, and the final mechanical assembly is completed by fusing the battery post elements with the battery cover bushing elements to produce the desired positive and negative battery terminals.

Following the burning of the battery bushing elements and battery post elements to form positive and negative terminals on the battery, acid filling, forming, and other operations may be conducted in order to produce a finished battery. Consequently, the burning process for forming integral, leak-proof battery terminals is only one step in the assembly of the complete electric storage battery.

In welding battery posts, either during the fusing process with battery cover bushing elements or with adjacent posts, it is possible to use a gas-oxygen torch or the like, of an intensity which will permit the delivery of sufficiently high temperature to the elements to be joined, while at the same time preventing the material at the upper end of the post closest to the flame from reaching excessive temperatures, such that early metal flow from the upper ends of the posts commences, such flow continuing down into the space between the posts and bushings and/or between the two posts above the separator plates, and solidifying there, before lower ends of the posts in the vicinity of the upper end of the separator plate and/or at the base of the bushings have become sufficiently heated, thereby resulting in an incomplete fusion of metal at a location corresponding to the base of the battery terminal to be formed and/or at the upper edge of the cell partition. Thus, the result is that while a good fusion may exist at the upper ends of the weld, often, at the lowermost ends of the weld the fusion is imperfect, with, insufficient bond to provide sufficiently low electrical resistance as a connector. In order to avoid this, an operator may play the torch between the various elements to be welded, however, particularly in the case of the polypropylene battery cover, it is not possible to hold the torch in close proximity to that battery cover for fear that the battery cover will become scorched or damaged around its junction with the bushing. It is, of course, well known to reduce the possibility of scorching and to otherwise improve the quality of a battery terminal post by placing molds around the battery terminals and by moving the torch relative thereto, either manually or otherwise, to produce the fusion of the posts and bushings. Nonetheless, the results of welding battery terminals often results in variations or lack of uniformity in weldments, depending upon the particular operator or welder involved, as well as resulting in an undesirable percentage of rejects due to welds that have a sufficiently good external appearance to pass customary quality controls, but which are really poor weldments. Furthermore, since the appearance of battery terminals, unlike intercellular connections, are available for visual inspection by the intended consumer, even if a weld of high electrical integrity is formed by the process the battery is likely to be rejected if the resulting battery terminal lacks a solid, uniform appearance.

SUMMARY OF THE INVENTION

The present invention is directed towards overcoming the above and other difficulties in connection with the welding of battery terminal posts, as well as with welding in general, by providing a novel method and apparatus whereby adjacent members, such as battery terminal posts and battery cover bushings, may be welded. In the preferred embodiment of the present invention, an apparatus is provided comprising a head means, movable along the vertical axis, having mounted thereon a mold means which is adapted to matably encircle the battery bushing element and battery post element to be fused, and to act as a mold when the head means capable of producing a variable intensity flame for preheating, melting and post warming said battery elements is mounted in slidable engagement on said head means. The heat which is applied thereby is automatically modulated not only by the proximity of the burning means as it moves towards and away from the battery elements to be melted, but also by a preselected variation of the intensity of the flame produced by the burning means, which variation is produced as the burning means moves between the pilot and the burning position. The novel flame regulation of the preferred embodiment of the present invention is accomplished through the use of a fixed trip member mounted on the head means, whiich cams with a lever means which is adapted to regulate the gas flow of the burner. Consequently, by reason of movement and the variable flame intensity described above, applicant has provided modulated heat application which produces an extremely uniform battery terminal.

A novel conveyor means is also provided which is adapted to sequentially store and move batteries from a first hold position to a second operating position. This conveyor means further provides clamp means for transversely forcing each of said batteries into a battery element fusing position with respect to the vertical axis of travel of said burning means and said mold means. A feed sensing means is mounted on the apparatus for sensing the longitudinal advancement of a battery from the hold position towards the operating position, and for causing the stop means to move from the normal position which does not impede the longitudinal movement of batteries to the stop position wherein batteries are halted at said hold and operating positions. The feed sensing means further causes the movement of the clamp means from its retracted to its clamped position in timed response to the sensing of longitudinal movement of batteries. An alignment sensing means then determines the movement of the clamp means to the fully clamped position, and causes a cylinder means to move a head means from its standby to its molding position, wherein molds which are adjustably mounted on the head means matably encircle said battery elements to define a void therearound of the shape of the desired battery terminal. As the head means moves to the molding position, an abort means senses the lack of a battery in the battery fusing position, as might occur where a battery has been manually removed or where the apparatus has otherwise malfunctioned. This abort means then overrides the remaining portion of the operating cycle of the apparatus, preventing the flame from firing and causing the head means to return to the standby position and the stop means to move from the stopped to the normal position so that the next battery may be introduced into the apparatus.

Alternatively, battery sensing means are provided to determine the presence of a battery in the fusing position when the head means assumes the molding position, which battery sensing means causes a hydraulic cylinder to move the burning means from its pilot to a burning position. As described above, the burning means further comprises a lever means for contacting a trip member fixedly engaged on the head means, thereby automatically regulating the intensity of the flame from a minimum pilot flame when the burning means is in the pilot position to a maximum when the burning means is in the burn position. As a result, as the burning means moves towards the elements to be fused, the intensity of heat administered to those elements increases as the result of the proximity of the flame to those elements, and also by reason of the intensity of that flame. Upon movement of the burning means to the burning position, a travel sensing means determines the presence of said burning means in that burning position and causes the aforementioned hydraulic means to immediately begin moving the burning means back to said pilot position. The aforementioned trip member and lever means similarly respond to the retraction of the burning means by gradually reducing the intensity of the flame to its pilot condition. As a result of this novel burner action, the battery elements to be fused are preheated prior to melting, which preheating helps to eliminate the production of a cold joint such as might occur had the high intensity flame initially been directly applied to the cold battery elements. During the melting portion of the cycle, the high intensity flame is in close proximity to the elements, causing the complete melting thereof. Finally, as the torch carriage returns towards the pilot position, a post-heating phase of the cycle occurs which prevents the outer surfaces of the terminal from prematurely cooling, thereby creating a puddling effect on the top of the melted terminal which produces an even, uniform terminal. As a final result, the novel burning cycle of the present invention produces a fused joint which is extremely even and in which there is no layering or antimony precipitation.

A novel mold temperature monitoring means is provided for sensing the temperature of the mold member during the burning process and allowing the temperature of that mold member to "spike" during the burn while disabling or delaying the apparatus, or sounding an alarm to indicate either the insufficiency of the chill time allotted or the inadequacy of the cooling fluid to cool the mold member to a suitable temperature prior to withdrawal of the mold member. In an alternate embodiment of the present invention, the chill time is directly controlled by the information received from the temperature sensing logic so that, depending upon the efficiency of the cooling system, the chill time may be shortened or lengthened. A further advantage of the present invention is that the use of this thermocouple logic allows the mold to run relatively warmer than normally permitted, thereby increasing the quality of joint produced without running the attendant risk of mold overheat.

Accordingly, one of the primary objects of the present invention is the provision of an electric storage battery post burner which produces a high quality, integral battery terminal. Another aim of the present invention is to provide a fully automated post burning station which rapidly and reliably processes batteries on which said terminals are to be formed.

Another object of the present invention is the provision of a novel temperature sensing means for regulating the chill time required to form any given battery terminal.

Further objects of this invention reside in the construction and particularly novel welding apparatus, more fully described hereinafter. Other objects and advantages of the present invention, such as apparatus and method particularly directed towards the welding of battery terminal posts, will be readily apparent, as will objects of a generally broader nature, from a reading of the following brief description of the drawings, detailed description of the preferred embodiment, and the appended claims.

BRIEF DESCRIPTION OF THE DRAWINGS

FIG. 2 is a greatly enlarged side view of a portion of the apparatus shown in FIG. 1 taken as indicated by the lines and arrows 2—2 in FIG. 1, parts of which have been cut away;

FIG. 3 is a top view of a portion of the mold means shown in FIG. 2 taken as indicated by the lines and arrows 3—3 in FIG. 2;

FIG. 4 is a cross section of the mold means shown in FIG. 3 taken as indicated by the lines and arrows 4—4 in FIG. 3;

FIG. 5 is a cross section of the mold means shown in FIG. 4 taken as illustrated by the lines and arrows 5—5 in FIG. 4;

DETAILED DESCRIPTION OF THE DRAWINGS

Figure 1:
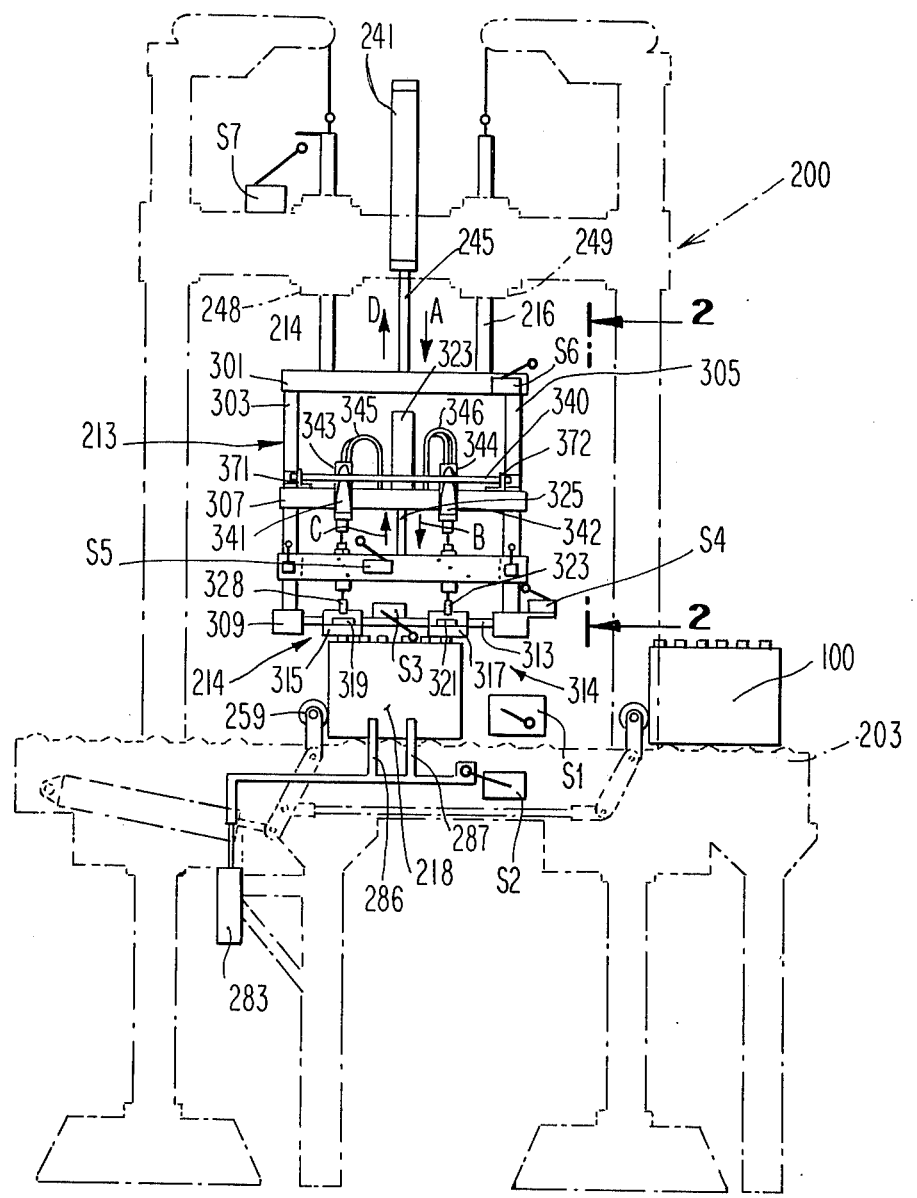
FIG. 1 is a front view of an apparatus for burning battery terminal posts and battery cover bushings in accordance with the preferred embodiment of the present invention, the supporting structure for which is shown in phantom.

Although specific forms of the invention have been selected for illustration in the drawings, and the following description is drawn in specific terms for the purpose of describing these forms of the invention, this description is not intended to limit the scope of the invention which is defined in the appended claims.

Referring now to the drawings in detail, reference is made to FIG. 1, which shows the automated post burn station of the present invention. Many of the structural details of this automated post burn station are shown in phantom in FIG. 1, and in particular, the supporting structure in much of the conveying mechanism of this post burn apparatus is illustrated in phantom. Except as otherwise indicated herein, the structure and function of this automated post burn station is the same as that described in my prior copending patent application entitled "Automated Post Burn Station," U.S. Ser. No. 618,772, filed Oct. 2, 1975, now U.S. Pat. No. 3,980,126, which disclosure is fully incorporated as if fully set forth herein.

As seen in FIG. 1, the welding assembly designated generally 213 is comprised of a head means movable with respect to the frame 200 of the apparatus along a vertical axis by means of the operation of the cylinder 241 and rod 245 as described above, and a mold means 214 adjustably mounted on said head means for slidably engaging said head means also for movement with said head means along that vertical axis. The head means of the preferred embodiment of the present invention comprises air cylinder 241, cylinder rod 245, shaft adaptor block 301, shaft manifold rods 303 and 305, respectively, and upwardly depending rods 214 and 216. The mold means 214, which is adjustably mounted in said head means, is mounted on longitudinal supporting rod 313 extending between carriage blocks 309 and 311. The mold carriage blocks 315 and 317 act as the supporting structure for molds 319 and 321, which will be more fully described hereinafter. The apparatus shown in FIG. 1 illustrates the position wherein the head means is in its molding position by means of the full extension of rod 245, as indicated by the clearance of upwardly extending rods 214 and 216 and the space disposed between shaft adaptor block 301 and bearing assemblies 248 and 249. Upon activation of cylinder 241, which is a double-acting cylinder, the head means may be moved from the molding position as shown in FIG. 1 to a standby position wherein shaft adaptor block 301 is substantially contiguous to bearing assemblies 248 and 249. The burning means of the present invention is capable of selectively producing a flame for melting the battery elements to be fused, said burning means being mounted in slidable engagement along the vertical axis of movement of the head means, being slidably movable in that axis with respect to said head means. Hydraulic cylinder 323, which is a doubleacting hydraulic cylinder, and rod 325, which is associated therewith, are actuatable to produce the movement of torch carriage 327 along the lower portions of manifold shafts 303 and 305. As may be seen in FIG. 1, locating template 329 is provided on the torch carriage for precisely positioning the burning tips 228 and 233 within the longitudinal axis of of advancement of the batteries along the conveyor 203. As illustrated in FIG. 1, the torch carriage 327 is in the burning position, as indicated by the close proximity between the burning tips 228 and 233 and the molds 219 and 321, respectively. Movement to the burning position has been produced by the extension of rod 325 in response to the activation of hydraulic cylinder 323. Not shown in FIG. 1, but important to the functioning of the torch carriage in a safe manner, is the provision of spring biased means extending between the manifold block 307 and the torch carriage designated generally 327, which spring biased means act to return the torch means to its pilot position in the event of power failure. In normal operation, however, the torch carriage is returned to its pilot position through activation of hydraulic cylinder 323, which causes the retraction of rod 325 and consequently draws torch carriage 327 towards manifold block 307, so that the torch carriage and manifold block are substantially contiguous to each other. In the burning position, as shown in FIG. 1, the trip bar 340 is engaging and depressing trip levers 341 and 342, which are attached to torches 343 and 344 by means of gas supply line 345 and 346, which are in communication with suitable sources of oxygen and other combustible gases.

Referring now to FIG. 2, which is a partially cut away side view of the welding assembly designated generally 213, the operation of the preferred embodiment of the present invention can best be explained. As seen in FIG. 2, the torch carriage designated generally 327 in its pilot position, at which time the flames emanating from burning tips 228 and 233 would be of the minimum intensity. Mold carriage blocks 315 and 317 are mounted in sliding engagement along a longitudinal axis on longitudinal bar 313, which is supported at either end by carriage blocks 309 and 311. Torches 343 and 344 are mounted at an acute angle with respect to the vertical axes of radial symmetry of burning tips 228 and 233 so that torch levers 341 and 342 are disposed over trip bar 340. L brackets 371 and 372 are fixedly attached to manifold shafts 303 and 305. Trip bar 340 is held in rotating engagement between L brackets 371 and 372 by means of cotter pins piercing said trip bar 340, which engagement allows trip bar 340 to rotate upon engagement with torch levers 341 and 342. As seen in FIGS. 1 and 2, as the torch carriage designated generally 327 moves from its pilot position to the burning position, the torch 344 and torch lever 342 are brought down to engage the trip bar 340, shown in cross section in FIG. 2. Since the torch lever 342 is adapted to control the intensity of the flame produced at the burning tip 233, it may be seen that as the torch carriage designated generally 327 moves from the pilot to the burning position, the intensity of the flame produced at the burning tip 233 is correspondingly increased. As may clearly be seen in FIG. 2, the disposition of the burning tip 233 with respect to mold 320 allows the flame produced at burning tip 233 when the torch carriage is near the pilot position to preheat in a gentle manner the bushing and battery terminal posts which would normally be disposed within the mold 320 when the head means was in the molding position. The mold carriage block 317 which acts as a support for mold 320 is seen to have disposed therewithin at least one circulating chamber having cooling fluid disposed therein for cooling the mold carriage block 317 during the molding process. Furthermore, the block itself is selected for its high heat transfer capacity, and is therefore composed of aluminum or other high heat transfer material. Similarly, and in direct opposition to the prior art teaching with respect to lead molds, the mold 320 is itself composed of aluminum or other high heat transfer material. As seen in FIG. 2, the engagement of mold 320 with mold carriage block 317 is tight, therefore allowing good heat transfer between these elements and cooling fluid 397 which is constantly being circulated therethrough. The interior surfaces 396, 395, and 394 of mold 320 have disposed thereon an aluminum oxide coating 500 or, that is, the interior surfaces 394, 395 and 396 are hard surface anodized in order to create a thermal barrier between the mold and mold void defined by the mold 320 and the solid aluminum which composes the mold.

In order to attain high quality welds, the mold 320 should ideally be kept between 140° and 200° F. during the chilling portion of the molding cycle and should be allowed to rise to approximately 250° F. at the hottest portion of the cycle which should occur at or about the end of the burning phase, and at the beginning of the post-heating phase, at which time a puddling of the lead in the mold occurs.

Referring now to FIG. 5, mold 320 is seen disposed within mold carriage block 317 which has defined therein a cooling channel 110. Cooling fluid is introduced through bushing 112 as indicated by arrow F in FIG. 5 and is circulated through cooling channel 110 to exit by bushing 114 as indicated by arrow G in FIG. 5. Clean-out plug 116 is provided to allow maintenance of the cooling channel 110. As seen in FIG. 4, the mold designated generally, 320 is configured to mate with carriage block 317 to provide a maximum surface area between the mold 320 and the mold carriage block 317 to facilitate rapid and even cooling of the mold 320. Screws 118 and 120 are provided to firmly secure the mold 320 into the mold carriage block 317. A bore 122 is defined in mold 320 and more particularly, is defined in a raised shoulder 126 formed on the upper surface thereof. A thermocouple probe 124, which is mounted to spring bias into bore 122 and which further extends through vertical portion 128 of the mold carriage block 317, is provided to monitor the temperature of the mold as will be more fully explained hereinafter. The vertical portion 128 of mold carriage block 317 is threaded to receive tubing 130 which is adapted to engage a spring bias bayonet-type fitting which is formed on thermocouple 132. As clearly illustrated in FIGS. 3 and 4, thermocouple probe 124 may not be introduced into bore 122 unless and until mold 320 is firmly seated along its surfaces against mold carriage block 317, and further, cannot be introduced unless the screws 118 and 120 are preperly aligned over their respective threaded bores formed in mold carriage block 317. Consequently, the mounting of the thermocouple 132 through a vertical portion of mold carriage block 317 in spring biased fashion ensures not only the positive contact of thermocouple probe 124 with mold 320, but also assures that prior to operating the apparatus, proper alignment of the various respective members is achieved.

Having described the apparatus of the preferred embodiment of the present invention, the operation of that apparatus in fusing battery cover bushings to battery terminal posts may be described as follows:

FIG. 1 also provides a schematic representation of the various sensing means of the preferred embodiment of the present invention shown in association with the front elevation of an apparatus in accordance with the preferred embodiment of the invention. FIG. 1 shows and is intended to highlight the automated features of the preferred embodiment which, under normal operating conditions, will function entirely without an operator being present. The conveyor means 203 in FIG. 1 is shown with the battery 218 in the fusing position. The battery 218 is brought into the fusing position by its introduction from the hold position as shown by battery 100 to its operating position. Upon the longitudinal advancement of the battery 218 from the hold position to the operating position, movable rollers are in the normal position, feed sensing means S1 shown in FIG. 1 is activated by the passage of the battery thereby. Consequently, the feed sensing means S1 is mounted on the apparatus for sensing the longitudinal advancement of a battery from the hold position towards the operating position, and for causing the stop means to vove from the normal position which does not impede the longitudinal advancement of batteries to the stop position wherein batteries are held at the hold and operating position. The feed sensing means further causes the delayed activation of clamp means comprising hydraulic cylinder 283 and fingers 286 and 287 which are pivoted upwardly and between the rollers against battery 218 and are further driven by cylinder 283 until battery 218 is locked into place in a predetermined position with respect to a horizontal axis transverse to the longitudinal axis of advancement of the batteries. In the preferred embodiment of the present invention, the feed sensing means is adapted to activate the clamp means including cylinder 283 in a timed response interval which is between 0.2 and 5 seconds after the sensing of the passage of battery 218 from the hold to the operating position. This time delay interval is selected to allow battery 218 to abut roller 259 prior to the activation of the clamp means. Alignment sensing means S2 is provided to sense the full extension of fingers 286 and 287 either directly, or indirectly as shown in FIG. 1 by sensing the degree of rotation of a protrusion mounted on a shaft which rotation corresponds to the rotation of fingers 286 and 287. Once the alignment sensing means S2 determines the full movement of the clamp means to the fully clamped position, indicating that the battery has been forced from the operating to the fusing position, cylinder 241 is then activated to move the head means, which comprises the welding assembly designated generally 213 in the direction as indicated by arrow A. Since the battery 218 is in precise alignment with respect to the welding assembly 213, the mold carriage blocks 315 and 317, and the corresponding molds contained therein will matably encircle the battery bushing elements and battery post elements protruding from the top of battery 218. In the event that no battery has been introduced into the apparatus due to machine malfunction, abort means S7 will be activated by the over travel of the welding assembly, and particularly, by the travel of rod 214 beyond the normal molding position. Upon the activation of abort means S7 caused by the absence of a battery in the fusing position, the remaining portion of the operating cycle of the apparatus is then overridden, preventing the activation of the burning or torch carriage and causing the immediate return of the head means and welding assembly to the standby position, and further causing the stop means to move from the stop to the normal position so that the next battery may be introduced into the apparatus. If a battery, such as battery 218 shown in FIG. 1 is present when the welding assembly designated generally 213 moves from the standby to the molding position, battery sensing means S3 will sense the presence of a battery in the fusing position of the torch carriage 327 along the lower portions of manifold shafts 303 and 305. As hereinbefore described, the burning means mounted on the torch carriage comprises lever means for contacting a trip member which automatically regulates the intensity of the flame from a minimum pilot flame when the burning means is in the burn position as shown in FIG. 1. Consequently, the battery sensing means produces a movement of the torch carriage designated generally 327 in the direction as indicated by arrow B in FIG. 13 to a point as shown in FIG. 14 in the burning position wherein a maximum flame intensity is directed at the battery bushing element and battery post element encircled by each mold.

Upon movement of the torch carriage designated generally 327 to its fully extended burning position, a travel sensing means S4, which is mounted on the head means as shown in FIG. 14 senses the presence of the burning means in that burning position and causes the aforementioned hydraulic cylinder 323 to immediately begin moving the burning means back to the pilot position, as designated in FIG. 1 by arrow C. The aforementioned trip member and lever means respond to this retraction by reducing the intensity of the flame until, when the torch carriage reached the pilot position, a return sensing means S5 which is mounted on the torch carriage designated generally 327 determines the return of the burning means to the pilot position and causes cylinder 241 to move the head means to the standby position as indicated by arrow D in FIG. 14 in times response thereto. In the preferred embodiment of the present invention, cylinder 241 is activated by a delay interval of between 0.2 and 5 seconds, which time period creates a post chill time following the return of the torch carriage to the pilot position which is sufficient to allow at least partial solidification of the battery terminal posts.

Figure 7:
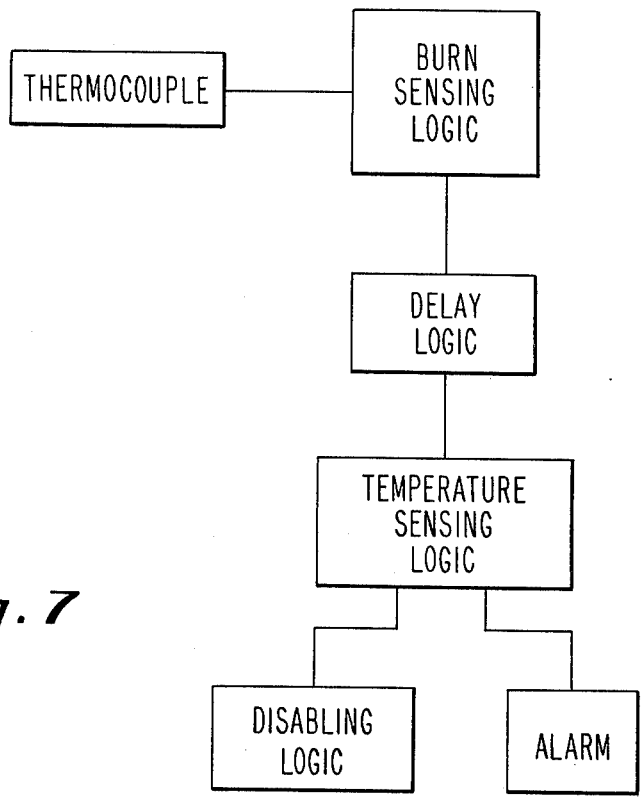
FIG. 7 is a diagrammatic representation of the logic employed in the preferred embodiment of the present invention.
Figure 6:
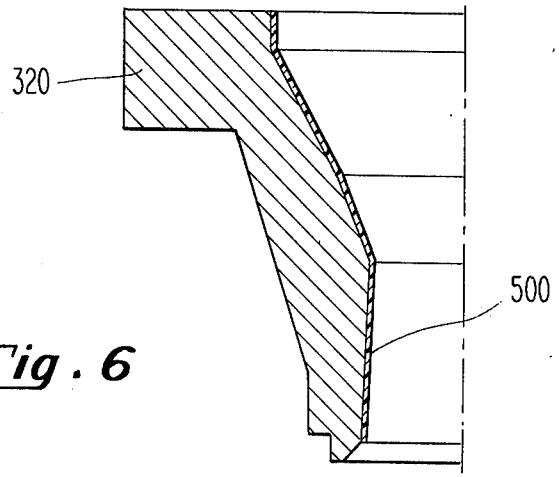
FIG. 6 is an enlarged radial cross section of the mold of the present invention showing an oxide coating disposed thereon.

Referring now to FIG. 7, which is a diagrammatic representation of the logic incorporated in the preferred embodiment of the present invention, the relation of the thermocouple to the remainder of the apparatus is illustrated. The thermocouple, as described hereinabove, constantly monitors the temperature of the mold, which mold temperature is preferably held between 140° F. and 200° F. during the coolest portions of the cycle, but is allowed to rise to approximately 250° F. at the hottest portion of the cycle. If the mold is held to temperatures under 140° F. during this cycle, the mold will be overchilled and the puddling effect described above will not be attained, thereby producing unsatisfactory terminals. On the other hand, in the event that the mold is not effectively cooled to within the preferred range prior to retraction of the head means, and consequent withdrawal of the molds, stresses or fracture lines or other defects may be formed in the terminals which render these terminals unsatisfactory. The problem of maintaining a uniform mold temperature is further complicated by the fact that the temperature of the incoming cooling fluid cannot be efficiently maintained to thereby establish a mold temperature equilibrium during the operation of the machine. In some installations, tap water may be used as the cooling medium which is circulated through the mold carriage block, however, seasonal variations of at least as much as 50° F. in tap water temperatures combined with the relative variations in torch temperatures which are encountered depending upon the adjustment thereof makes it difficult to establish equilibrium operating condition which insures the production of good battery terminals. Although it is also possible to utilize a recirculating system having a cooling reservoir, once again, depending upon the torch adjustment and season, the reservoir, unless provided with elaborate temperature equilibrium means, will also vary substantially in temperature. Accordingly, the above described variations may be compensated for and the uniformity and quality of welds assured by incorporating the aforementioned thermocouple into the apparatus as diagrammatically illustrated in FIG. 7.

During the operation of the apparatus, the thermocouple continually monitors the temperature of the mold relating that information to the burn sensing logic. In the preferred embodiment of the present invention, the burn sensing logic is adapted to respond to an input which rises above a pre-selected temperature. Depending upon the alloy welded and the other parameters discussed above, this pre-selected temperature may be any temperature above 140° to 250° F. and preferably, between a range of 200° and 250° F. as, for example, 225° F. As during the burn cycle, the temperature of the mold as indicated by the thermocouple input to the burning sensing logic, reaches this preselected temperature of, for example, 225° F., the burn sensing logic will trigger delay logic, which delay logic will delay the further transfer of information for an interval of between 0.1 and 15 seconds. The delay caused by the delay logic will allow the temperature to spike and puddling to occur during the hottest portion of the welding cycle thereby, under normal conditions, allowing the temperature as monitored by the thermocouple to return to a level below the aforementioned pre-selected temperature. In this case, during the normal operation of the machine, the temperature sensing logic will not function to either disable or delay the machine further or sound an alarm as will be more fully described hereinafter. In the event that upon the expiration of the aforementioned interval caused by the delay logic, the temperature of the mold has not returned to below the preselected level, information will be transferred to the temperature sensing logic which senses the fact that the mold has not been cooled to a sufficient degree to insure that a good weld has been made. In this event, the temperature sensing logic may activate further disabling logic and/or will sound an alarm in order to summon an operator. The disabling logic may either halt the operation of the entire apparatus until the mold temperature returns to a suitable level, or alternatively, may inhibit the return sensing means S5 to thereby extent the preselected post-chill time to automatically compensate for an otherwise overheated mold. To this end, it is expected that the aforementioned post-chill time may be shortened to as little as two and one-half seconds or less without the attendent concern that inadequate cooling of the mold might result in defective battery terminals. In particular, when a particularly low temperature cooling fluid is circulated through the mold carriage blocks, the shorter chill time delay will allow the faster processing of batteries and the subsequent heating of the molds and mold carriage blocks to within the desired range of over 140° F., which heating would not otherwise occur had a longer chill time been utilized. Further, the above described logic will automatically compensate for different torch settings and fuels, thereby maintaining the molds and mold carriage blocks within the desired temperature range. The result is an extremely sophisticated feedback repression-type system which ensures the uniformity of battery terminals welded thereby.

Activation of cylinder 241 to return the head means along the direction of arrow D shown in FIG. 14 causes the head means to move to the standby position. Reset sensing means S6 mounted on the head means, or alternatively, on the transverse structural member 205 senses and determines the movement of said head means to said standby position causing the stop means to move from the stop to the normal position, thereby allowing the passage of the battery which terminals were fused out of the fusing position while simultaneously allowing for the introduction of the next battery to be processed into the operating position as heretofore described. In order to facilitate this longitudinal advancement of batteries, the clamp means is similarly caused to move to the retracted position by the reset means S6 thereby causing fingers 286 and 287 to withdraw to the retracted position, thereby also resetting alignment sensing means S2.

As a result of the above description, it is apparent that the apparatus of the present invention is fully automated facilitating the rapid and reliable production of batteries incorporating high quality integrally fused battery terminals.

It will be understood that various changes in the details, materials and arrangement of parts wich have been described and illustrated in order to explain the nature of this invention, may be made by those skilled in the art within the principle and scope of the invention as expressed in the appended claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

I claim:

1. An automated apparatus for sequentially forming integrally fused battery terminals on a plurality of storage batteries, each of which comprises at least one battery post element and adjacent bushing element, said apparatus comprising:
   a. a frame;
   b. a mold means movable between first standby, and second molding positions, said mold means further comprising at least one interchangeable mold and at least one mold carriage block means for establishing a direct heat transfer relationship between said carriage block means and said mold when said mold is disposed in mating engagement with at least a portion of said carriage block means;
   c. a burning means for melting and fusing said battery elements; and
   d. at least one thermocouple means for directly sensing the temperature of said mold for determining the effectiveness of said heat transfer relationship between said mold and said carriage block means and for preventing said mold means for moving from said molding position to said standby position while said mold exceeds a preselected mold temperature.

2. An automated apparatus for sequentially forming integrally fused battery terminals on a plurality of storage batteries, each of which comprises at least one battery post element and adjacent battery bushing element, said apparatus comprising:
   a. a frame;
   b. a mold means movable between first standby, and second molding positions, said mold means being adapted to matably encircle said battery elements in said molding position, and said mold means further comprising a mold carriage block having a removably mounted mold disposed in mating engagement therewith, said mold carriage block further comprising fluid cooling means for directly cooling said mold carriage block and for indirectly cooling said mold;
   c. a burning means for melting and fusing said battery elements; and
   d. a thermocouple means for monitoring the temperature of said mold means for directly sensing the temperature of said mold, and for preventing said mold means for moving from said molding position to said standby position while said mold exceeds a preselected mold temperature, said thermocouple being mounted on said mold carriage block and being spring biased against said mold.

3. An automated apparatus for sequentially forming integrally fused battery terminals on a plurality of storage batteries, each of which comprises at least one battery post element and adjacent battery bushing element, said apparatus comprising:
   a. a frame;
   b. a mold means movable between first standby, and second molding positions, said mold means being adapted to matably encircle said battery elements in said molding position, and said mold means further comprising a mold carriage block having a removably mounted mold disposed in mating engagement therewith, said mold carriage block further comprising fluid cooling means for directly cooling said mold carriage block and for indirectly cooling said mold;

c. a burning means for melting and fusing said battery elements; and d. a thermocouple means for monitoring the temperature of said mold means for directly sensing the temperature of said mold, and for preventing said mold means from moving from said molding position to said standby position while said mold exceeds a preselected mold temperature, said thermocouple being mounted on said mold carriage block, and said mold further comprising a bore adapted to receive said thermocouple, said bore in said mold being penetrable by said thermocouple only if said mold and said carriage block are in direct heat transfer relation to each other.

4. The invention of claim 3, wherein said temperature sensing means further comprises delay logic means for allowing said temperature to exceed said preselected temperature for a duration of between 0.1 and 15 seconds.

5. The invention of claim 4, wherein said temperature sensing means further comprises an alarm.

* * * * *